(12) United States Patent
Chen et al.

(10) Patent No.: US 9,540,067 B2
(45) Date of Patent: Jan. 10, 2017

(54) AUTOMATIC SHOCK ABSORBER SYSTEM FOR A BICYCLE

(71) Applicant: GIANT MANUFACTURING CO. LTD, Taichung Hsien (TW)

(72) Inventors: Min-Chang Chen, Taichung (TW); Chung-Wei Lin, Taichung (TW)

(73) Assignee: GIANT MANUFACTURING CO. LTD, Taichung Hsien (TW)

( * ) Notice: Subject to any disclaimer, the term of this patent is extended or adjusted under 35 U.S.C. 154(b) by 0 days.

(21) Appl. No.: 14/685,087

(22) Filed: Apr. 13, 2015

(65) Prior Publication Data

US 2016/0297496 A1    Oct. 13, 2016

(51) Int. Cl.
  *B62K 25/00*  (2006.01)
  *B62K 21/00*  (2006.01)

(52) U.S. Cl.
  CPC .......... *B62K 25/00* (2013.01); *B62K 2207/00* (2013.01)

(58) Field of Classification Search
  USPC ............................................. 701/37; 280/276
  See application file for complete search history.

(56) References Cited

U.S. PATENT DOCUMENTS

| | | |
|---|---|---|
| 4,881,750 A | 11/1989 | Hartmann |
| 5,217,246 A | 6/1993 | Williams |
| 5,445,401 A | 8/1995 | Bradbury |
| 5,456,480 A | 10/1995 | Turner |
| 5,509,677 A | 4/1996 | Bradbury |
| 5,975,225 A | 11/1999 | Kamen |
| 6,026,939 A | 2/2000 | Girvin |
| 6,149,174 A | 11/2000 | Bohn |
| 7,275,607 B2 * | 10/2007 | Kamen .................. A63C 17/01 180/7.1 |
| 7,350,787 B2 | 4/2008 | Voss |
| 7,407,175 B2 * | 8/2008 | Kamen .................. B62D 51/02 180/218 |
| 8,286,982 B2 | 10/2012 | Plantet |
| 8,825,322 B1 | 9/2014 | Ikemoto |
| 2002/0180166 A1 * | 12/2002 | Voss .......................... B62J 99/00 280/5.5 |
| 2004/0074720 A1 * | 4/2004 | Thieltges ............... F16F 15/022 188/318 |
| 2007/0262555 A1 * | 11/2007 | Fox .......................... B62K 25/04 280/276 |
| 2015/0053494 A1 * | 2/2015 | Belon ...................... G01B 7/30 180/206.3 |

* cited by examiner

Primary Examiner — Tyler Paige
(74) Attorney, Agent, or Firm — Vierra Magen Marcus LLP

(57) ABSTRACT

An apparatus for automatically controlling a shock absorber system for a bicycle comprises a position sensor system configured to detect information indicative of a position of a rider of the bicycle and a controller in communication with the position sensor system. The controller adjusts the shock absorber system based on the detected information. The adjusting of the shock absorber system can include adjusting a damping force of the shock absorber system and/or adjusting sag of the shock absorber system.

15 Claims, 15 Drawing Sheets

| Riding Position | Damper |
|---|---|
| sitting | D0 |
| sprint | D1 |
| attack | D2 |
| rearward | D3 |

| Riding Position | Position Type | Damper Setting |
|---|---|---|
| sitting | backward | soft |
| sprint | forward | firm |
| attack | backward | soft |
| rearward | backward | soft |

FIG. 5B

| Riding Position | Head Sensor | Saddle Post Sensor |
|---|---|---|
| sitting | middle | short |
| sprint | short | long |
| attack | short | short |
| rearward | long | middle |

FIG. 5C

| Riding Position | Head Sensor | Saddle Post Sensor | Top of Saddle Sensor |
|---|---|---|---|
| sitting | middle | short | short |
| sprint | short | long | long |
| attack | short | short | short |
| rearward | long | middle | long |

| Riding Position | Handle Bar Weight Sensor | Saddle Weight Sensor |
|---|---|---|
| sitting | low | high |
| sprint | high | none |
| attack | middle | none |
| rearward | low | none |

| Riding Position | Saddle Weight Sensor | Saddle Post IR Sensor |
|---|---|---|
| sitting | high | short |
| sprint | none | long |
| attack | none | short |
| rearward | none | middle |

| Riding Position | Rear Shock Sag (mm) | Fork Sag (mm) |
|---|---|---|
| sitting | 12.6 | 12.4 |
| sprint | 7.5 | 15 |
| attack | 12.2 | 21 |

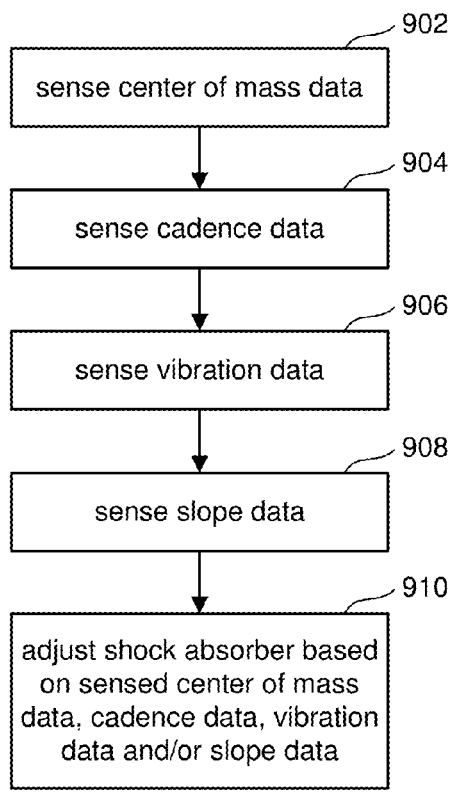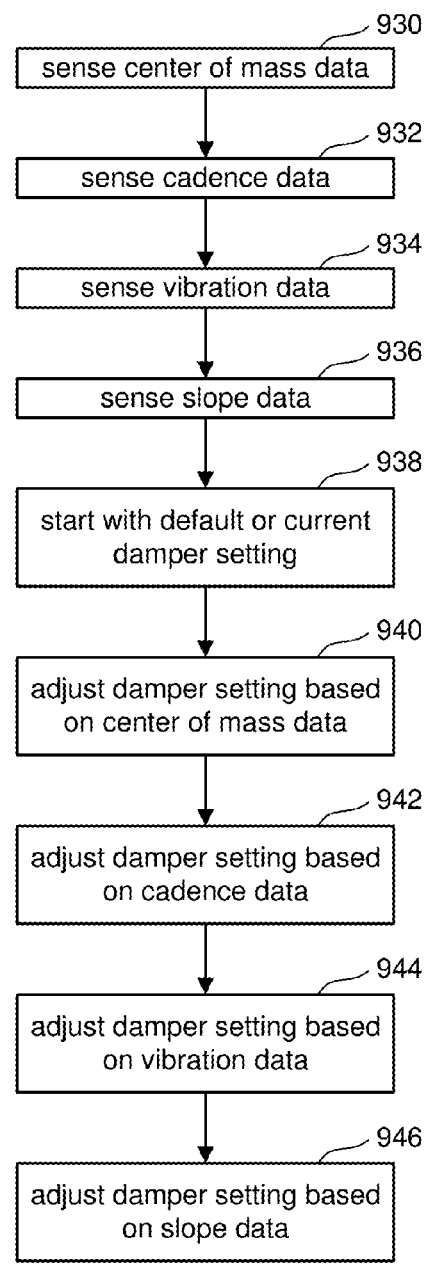

FIG. 10B1
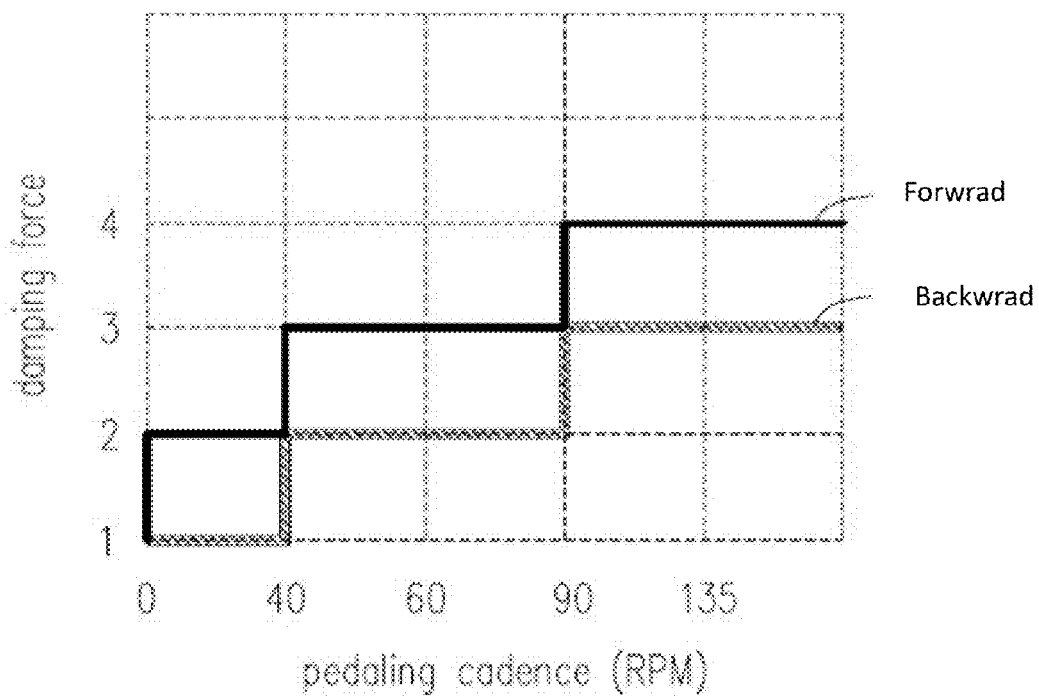
FIG. 10B2
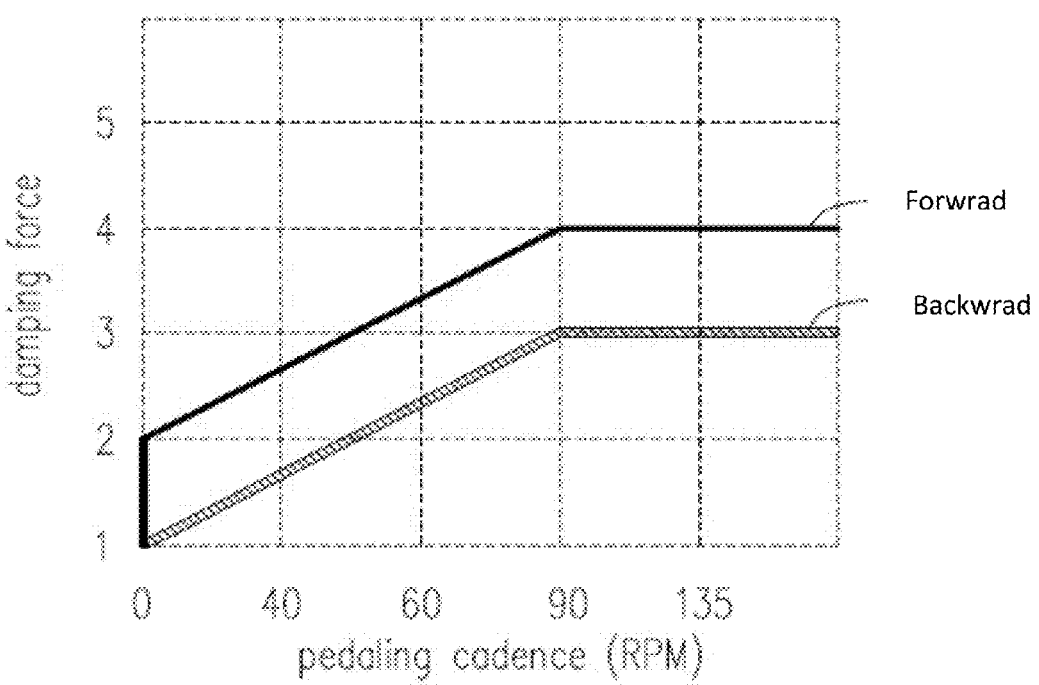

AUTOMATIC SHOCK ABSORBER SYSTEM FOR A BICYCLE

BACKGROUND

The technology described herein relates to vehicle suspension systems, and particularly relates to an automatic control of shock absorber systems for bicycles.

The conventional suspension control method for a bicycle makes use of a shock signal of a front wheel to open or switch a valve of a shock absorber, or uses shock acceleration of the front wheel to determine bumpiness of pavements, thereby controlling the valve of the shock absorber and thus adjusting the shock absorbing ability and reacting speed of the shock absorber.

However, an issue may arise in the conventional technology of shock absorber adjustment. Namely, when the shock signal of the front wheel is generated, the shock absorber coupled with the signal needs to react within a very short time, or the shock absorber does not function as it is supposed to. Also, generally speaking, when the front wheel takes the shock, the front shock absorber also takes the shock simultaneously. Thus, under the circumstance that the control is based on the shock signal of the front wheel, the front shock absorber is only able to make corresponding adjustments and control when taking the next shock. Accordingly, the front shock absorber is not able to make a timely adjustment.

BRIEF DESCRIPTION OF THE DRAWINGS

FIG. 5B is a table that correlates rider position with sensor information.

FIG. 5C is a table that correlates rider position with sensor information.

FIG. 10A is a flow chart describing one embodiment of a process for automatically controlling a shock absorber system for a bicycle.

FIGS. 10B1 and 10B2 are graphs that depict damper curves.

FIG. 10C is a flow chart describing one embodiment of a process for automatically controlling a shock absorber system for a bicycle.

DETAILED DESCRIPTION

It is proposed to control a shock absorbing system based on the rider's center of mass relative to the bicycle. One embodiment of an apparatus for automatically controlling a shock absorber system for a bicycle comprises a position sensor system configured to detect information indicative of a position of a rider of the bicycle and a controller in communication with the position sensor system. The controller adjusts the shock absorber system based on the detected information. The adjusting of the shock absorber system can include adjusting a damping force of the shock absorber system and/or adjusting sag of the shock absorber system.

Generally speaking, comfort and efficiency both need to be taken into account when it comes to bicycle riding. By adjusting a damper to be softer, it becomes more comfortable to ride, but a pedaling efficiency is lower. If the damper is adjusted to be firmer, the pedaling efficiency is improved, but it becomes less comfortable. Therefore, it is proposed to automatically adjust the damper, as well as other aspects of the shock absorber system, based on how the rider is operating the bicycle.

Figure 1:
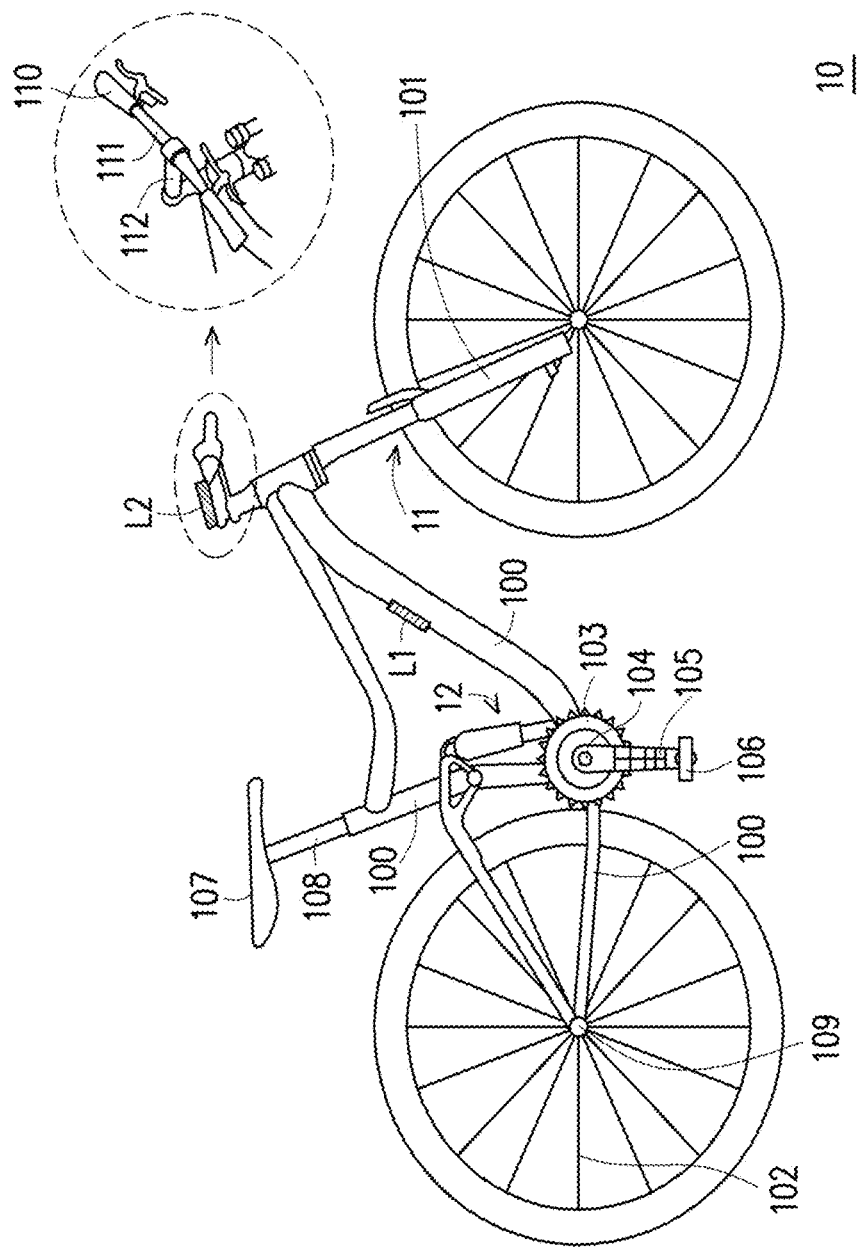
FIG. 1 depicts a bicycle.

FIG. 1 is a schematic view illustrating a bicycle 10 that includes a frame 100, a front fork 101 (connected to the front wheel), a chain ring 103, a crank spindle 104, a crank arm 105, a pedal 106, a saddle 107, a saddle post 108, a hub (i.e. a shaft at the center of rear wheel 102) 109, a grip 110, handle bars 111, and a bicycle handle 112. In this embodiment, the bicycle 10 also includes a front fork shock absorber 11 (disposed at the front fork 101) and a rear shock absorber 12 connected between the main frame and the rear frame. In other embodiments, it is possible that only one of the front fork shock absorber 11 and the rear shock absorber 12 is included with the bicycle 10. In the following, an automatic system for controlling a shock absorber for a bicycle is described by taking the bicycle 10 as an example.

The front fork shock absorber 11 and the rear shock absorber 12 have damper controls and sag controls. Damper indicated how soft or stiff the ride is. Sag is the amount that the shock absorber has compressed in response to the weight of the rider.

Figure 2:
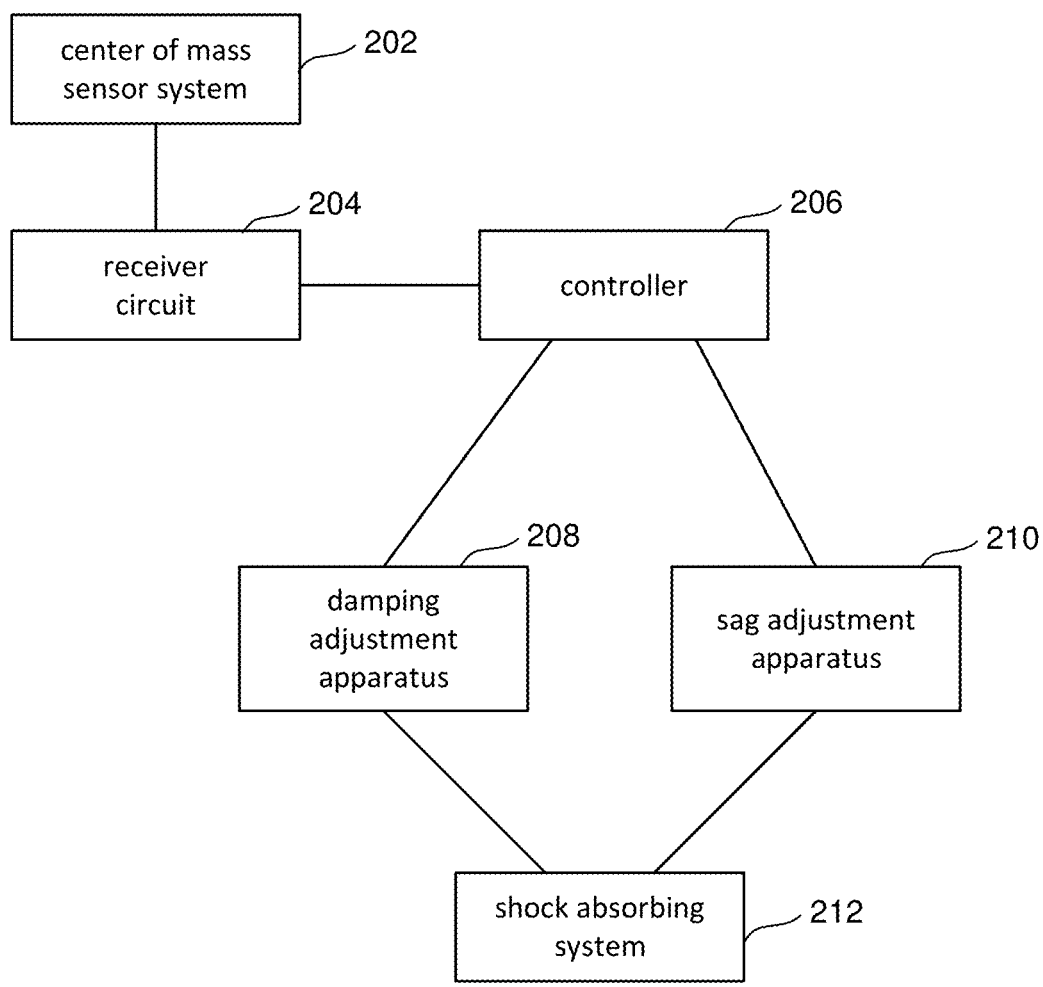
FIG. 2 is a block diagram of a system for automatically controlling a shock absorber system for a bicycle.

FIG. 2 is a block diagram of a system for automatically controlling a shock absorber system of a bicycle. The system includes a center of mass sensor system 202 connected to a receiver circuit 204, which is in communication with controller 206. Receiver circuit 204 can receive and transmit through wire or wirelessly. Controller 206 is connected (wired or wirelessly) to a damping adjustment apparatus 208 and a sag adjustment apparatus 210, both of which are connected or otherwise in communication with the shock absorbing system 212. In one embodiment, shock absorbing system 212 can be front fork shock absorber 11 and/or the rear shock absorber 12.

Center of mass sensor system 202 includes one or more sensors configured to detect information indicative of a position of the center of mass of the rider of the bicycle. In one embodiment, center of mass sensor system 202 determines the actual location of the rider's center of mass, while in other embodiments, center of mass sensor system 202 determines relative position information (e.g., forward, rearward, high, low, etc.). More information about center of mass sensor system 202 is provided below. Center of mass sensor system 202 can be used to automatically determine the actual riding position of a rider, or an estimate of position information.

Controller 230 can be any microprocessor or controller known in the art, as well as other control circuitry. No specific structure is required for the controller. In some embodiment, the controller is a simple circuit (i.e. an adjustment circuit) that processes the signals received from the sensors and outputs a control signal that controls or adjusts a level of a damping force and/or an amount of sag. In other words, by outputting the control signal to the damping adjustment apparatus 208, the controller 206 is capable of controlling compression damping, rebound damping, or an air pressure of a pneumatic spring. Controller 206 may also control a gear of a transmission or air pressure. Controller 206 may be disposed at a position L1 or a position L2, as indicated in FIG. 1. However, the positions L1 and L2 only serve as examples and controller 206 may be disposed at any position on the bicycle 10. In some embodiments, controller 206 can be connected directly to the shock absorbing system 212, without the need for damping adjustment apparatus 208 and sag adjustment apparatus 210.

In some embodiments, damping adjustment apparatus 208 is a circuit or mechanical actuator that can change the damping of the shock absorber. Damping adjustment apparatus 208 can be located at the front fork and/or at the rear shock absorber. Sag adjustment apparatus 210 is a circuit or mechanical actuator that can change the sag of the shock absorber. Sag adjustment apparatus 210 can be located at the front fork and/or at the rear shock absorber. In one embodiment, damping adjustment apparatus 208 and sag adjustment apparatus 210 can be implemented as a single component that performs both functions. In other embodiments, damping adjustment apparatus 208 and sag adjustment apparatus 210 can be part of the shock absorber.

Figure 3A:
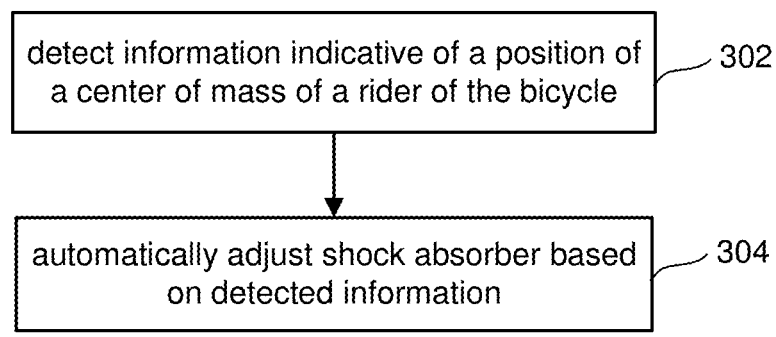
FIG. 3A is a flow chart describing one embodiment of a process for automatically controlling a shock absorber system for a bicycle.

FIG. 3A is a flow chart describing one embodiment of a process for automatically controlling a shock absorber system using the components of FIG. 2. In step 302, center of mass sensor system 202 detects information indicative of a position of a center of mass of a rider of the bicycle. The detected information can be in various forms, as no one particular format is required. For example, center of mass sensor system 202 may determine the actual location of the center of mass of the rider, a relative finding of the center of mas of the rider with respect to the bicycle, a riding position or other position information. Part of step 302 can also be performed by controller 206. In step 304, controller 206 automatically adjusts the shock absorber based on the detected information. The adjustment to the shock absorber can include adjusting the damping force of the shock absorber and/or adjusting the sag of the shock absorber. In other embodiments, step 304 can include controlling other components of the bicycle in addition to or instead of the shock absorber.

Figure 3B:
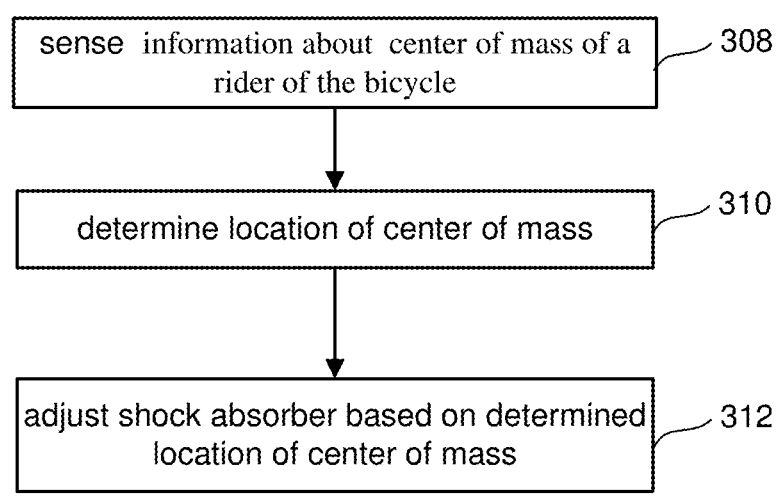
FIG. 3B is a flow chart describing one embodiment of a process for automatically controlling a shock absorber system for a bicycle.

FIG. 3B is a flow chart describing another embodiment of a process for automatically controlling a shock absorber system using the components of FIG. 2. The process of FIG. 3B is one example implementation of the process of FIG. 3A. In step 308, center of mass sensor system 202 senses information about the center of mass of the rider of the bicycle. In step 310, controller 206 calculates the actual location of the center of mass of the rider. Steps 308 and 310 are an example implementation of step 302 of FIG. 3A. In step 312, the calculated location of the center of mass is used to adjust the shock absorber. The adjustment to the shock absorber can include adjusting the damping force of the shock absorber and/or adjusting the sag of the shock absorber.

Figures 3C, 3D, 3E:
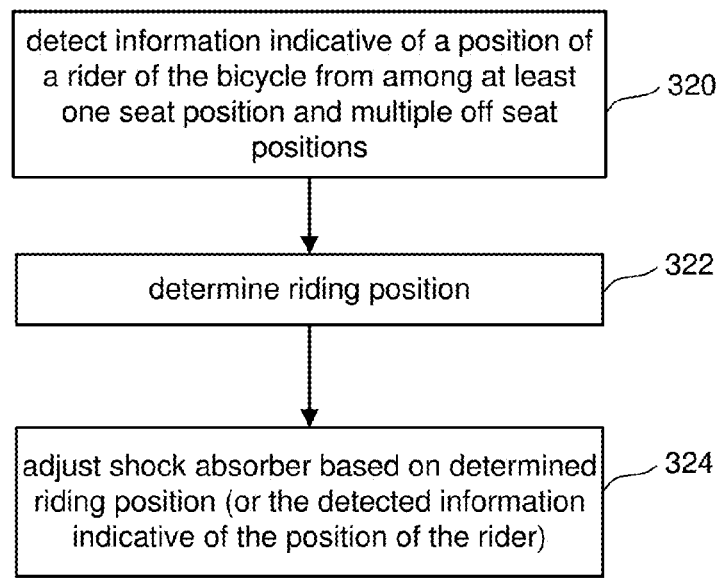
FIG. 3C is a flow chart describing one embodiment of a process for automatically controlling a shock absorber system for a bicycle.
FIG. 3D is a table that correlates damper setting to rider position.
FIG. 3E is a table that correlates damper setting and position type to rider position.

FIG. 3C is a flow chart describing another embodiment of a process for automatically controlling a shock absorber system using the components of FIG. 2. In step 320, a position sensor system (such as center of mass sensor system 202) detects information indicative of a position of a rider of the bicycle from among at least one seat position and multiple off seat positions. More details of seat positions will be discussed below with respect to FIGS. 4A-D. In step 322, controller 206 automatically (without human input) determines the riding position of the rider of the bicycle. Steps 320 and 322 are an example implementation of step 302 of FIG. 3A. In step 324, controller 206 adjust the shock absorber based on the determined riding position from step 322. In another embodiment, the adjustment of the shock absorber can be based on the detected information indicative of the position of the rider without actually reporting or identifying the actual riding position. Step 322 can also be implemented as part of step 320 or as part of step 324.

Figure 4A:
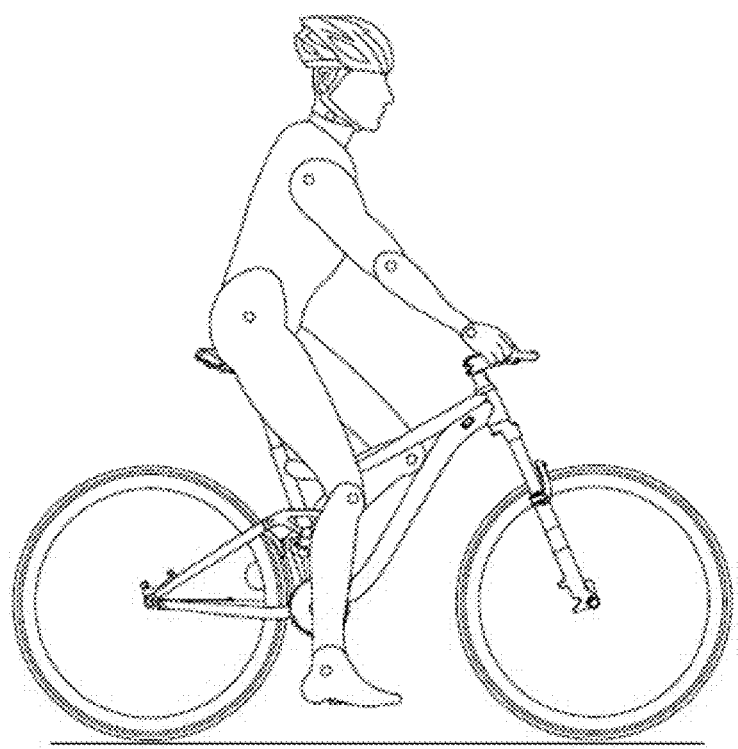
FIG. 4A depicts a rider in a sitting position on a bicycle.

In one embodiment, the systems identifies four riding positions: sitting position, sprint position, attack position and rearward position. Sitting is most common position, and corresponds to the rider buttocks directly contacted on saddle 107. Thus, the sitting position is an example of an on seat position. In the sitting position, traction is more important and damping can be set to a softer setting. FIG. 4A depicts a rider in a sitting position on a bicycle.

Figure 4B:
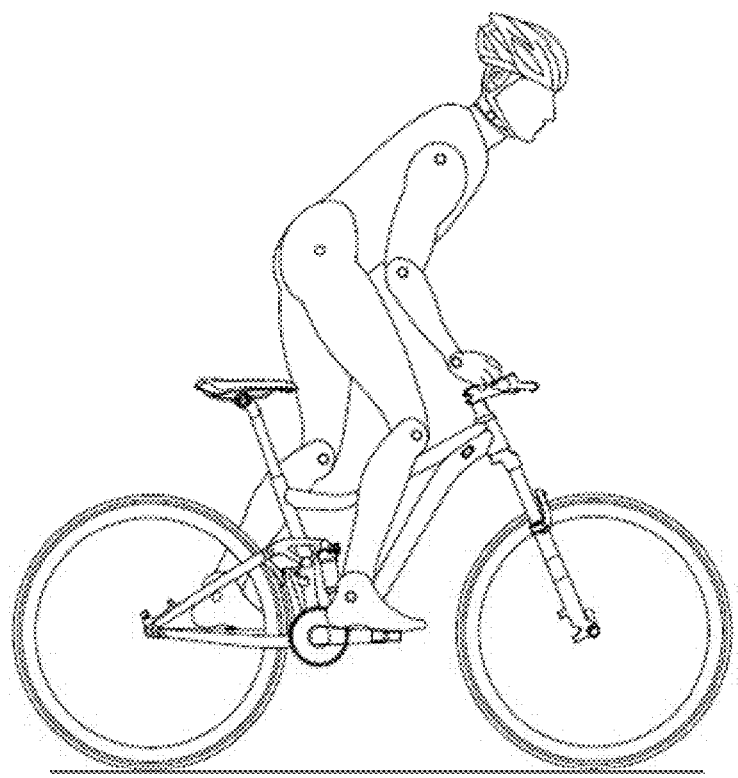
FIG. 4B depicts a rider in a sprint position on a bicycle.

The sprint position is usually for rider to output more power. For example, the rider may want to speed up the bike or pedal uphill. In this case, efficiency is more important, therefore, damping can be set to firmer. FIG. 4B depicts a rider in a sprint position on a bicycle. The sprint position is an example of an off seat position (meaning the rider is off of the saddle).

Figure 4C:
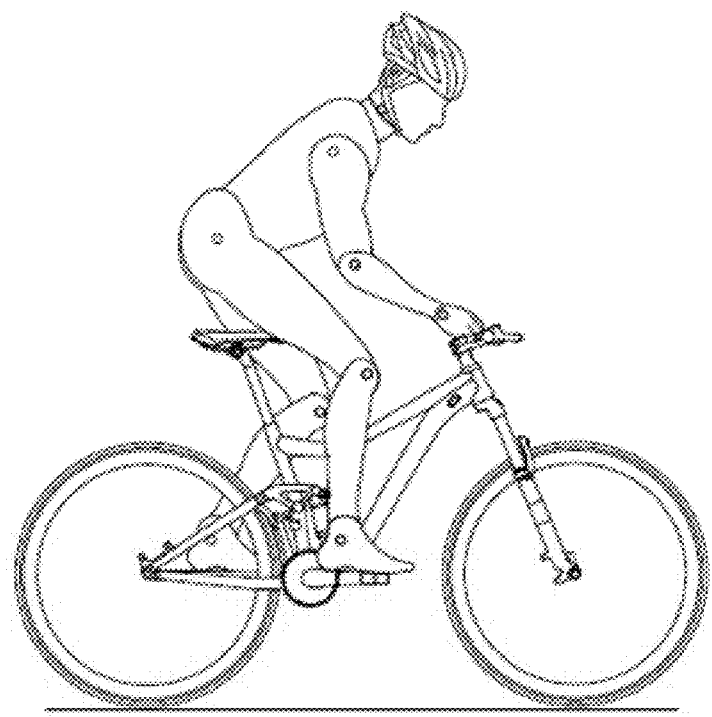
FIG. 4C depicts a rider in an attack position on a bicycle.

The attack position is usually for controlling the bike more nimbly, avoiding current/further ground impact, and/or trying to overcome a coming obstacle. In this case, traction is more important, therefore, damping can be set to a softer setting. FIG. 4C depicts a rider in an attack position on a bicycle. The attack position is an example of an off seat position.

Figure 4D:
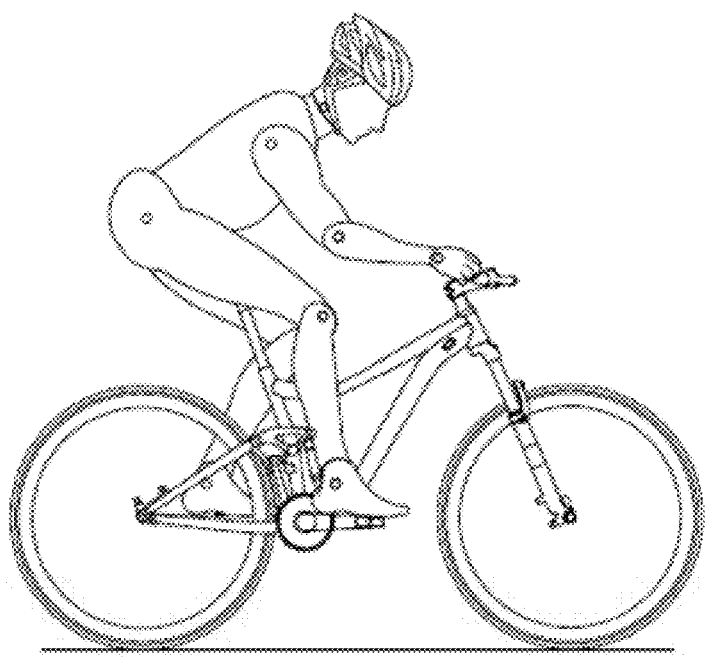
FIG. 4D depicts a rider in a rearward position on a bicycle.

The rearward position is usually for downhill riding. The rider generally has buttocks at or to the rear of the seat. In this case, traction is more important, so damping may be set to a softer setting. FIG. 4D depicts a rider in a rearward position on a bicycle. In one embodiment, the rearward position is an off seat position. However, in some implementations, the rearward position can be an on seat position.

Once controller 206 has identified the rider's position, that identified position is used to adjust the shock absorber system in step 324 of FIG. 3C. FIG. 3D is a table that provides one example implementation of step 324 for adjusting the damper setting of shock absorber system 212. If step 322 concludes that the rider is in the sitting position, then controller 206 sets the damper of shock absorber system 212 to a setting of D0, If step 322 concludes that the rider is in the sprint position, then controller 206 sets the damper of shock absorber system 212 to a setting of D1, If step 322 concludes that the rider is in the attack position, then controller 206 sets the damper of shock absorber system 212 to a setting of D2. If step 322 concludes that the rider is in the rearward position, then controller 206 sets the damper of shock absorber system 212 to a setting of D3. In one embodiment, D0 is different than D1, D2 and D3; D1 is different than D2 and D3; D2 is different than D3. In one embodiment, D0 is for soft damper, D1 is for a firm damper, D2 is for a soft damper and D3 is for a soft damper.

FIG. 3E is a table that provides one example implementation of step 324 for adjusting the damper setting of shock absorber system 212. FIG. 3E provides a correlation between riding position, position type and damper setting. While rider is in a sprint position, the center of mass is forward relative to bicycle; therefore, the position type is "forward" and the damper is set on a firm setting (which allows for absorbing less bumps in the road, but more efficient transfer of power from the rider). While a rider is in the attack position, rearward position or sitting position, the center of mass is backward relative to bicycle; therefore, the position type is "backward" and the damper is set on a soft setting (which allows for absorbing more bumps in the road). The rider's center of mass in backward position types is behind the rider's center of mass for forward position types. Note that "backward" does not mean that the rider is facing backwards, rather the rider's center of mass is in the back direction relative to the bicycle. In the embodiment of FIG. 3E, if step 322 of FIG. 3C concludes that the rider is in the sitting position, then controller 206 sets the damper of shock absorber system 212 to a soft setting, If step 322 concludes that the rider is in the sprint position, then controller 206 sets the damper of shock absorber system 212 to a firm setting. If step 322 concludes that the rider is in the attack position, then controller 206 sets the damper of shock absorber system 212 to a soft setting. If step 322 concludes that the rider is in the rearward position, then controller 206 sets the damper of shock absorber system 212 to a soft setting. Although the table of FIG. 3D only shows four riding positions, other embodiments can include more than four riding positions that can be categorized into the position types. Although the table of FIG. 3D only shows two position types, other embodiments can include more than two position types.

Although four positions are discussed herein, the technology described herein for controlling a shock absorber can be implemented using more or less than four positions, as well as different positions than those mentioned above. In another embodiment, rather than have defined positions, the system can have a set of curves, look up tables or mathematical functions that output damping or sag values based on the output of analog or digital sensors.

Figure 5A:
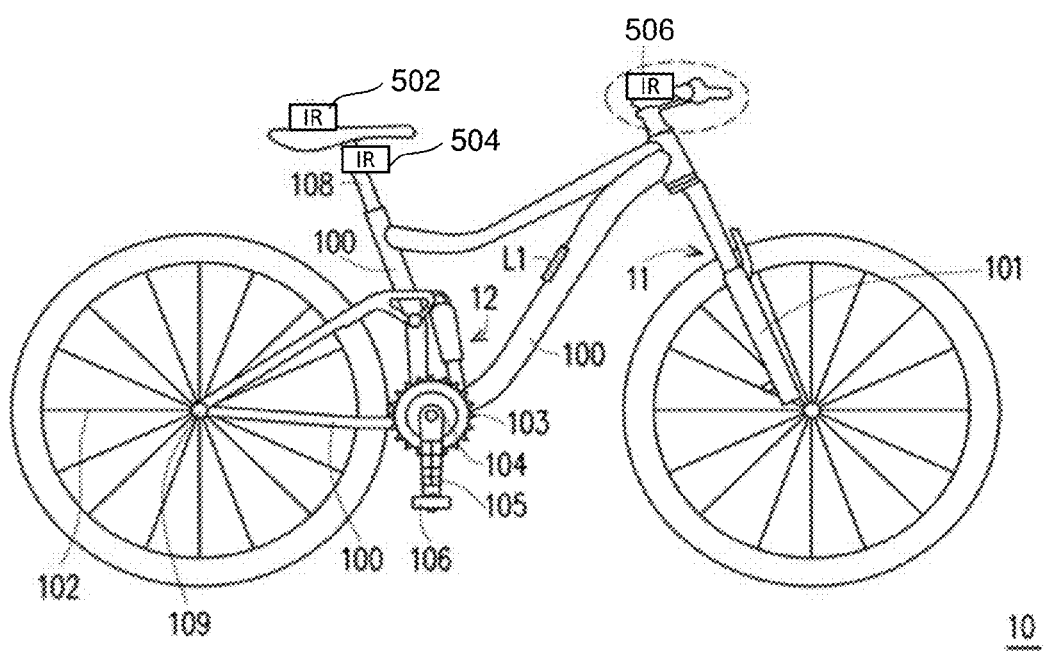
FIG. 5A shows the bicycle of FIG. 1 with multiple infrared sensors for detecting position information.

In one embodiment, center of mass sensor system 202 comprises one or more infrared (IR) sensors. For example, FIG. 5A depicts the bicycle 10 of FIG. 1 equipped with IR sensors 502, 504, and 506. IR sensor 502 is mounted on top of saddle 107. In one example implementation, IR sensor 502 is mounted within the saddle, so as to not interfere with the rider sitting on the saddle, but having its sensor input at the surface of the saddle. IR sensor 502 may be pointed upwards, forward or rearwards. In some embodiments, IR sensor 502 is actually more than one sensors so it can sense in multiple directions (e.g., upwards, forward and/or rearwards). IR sensor 502 can be used to detect the distance between the rider's buttocks and the top of the saddle. IR sensor 504 is mounted on the saddle post 108, and can be pointed upwards, forward or rearwards. In some embodiments, IR sensor 504 is actually more than one sensors so it can sense in multiple directions (e.g., upwards, forward and/or rearwards). IR sensor 504 can be used to detect distance between the saddle post and the rider's legs. IR sensor 506 is mounted on, at or near the handlebars, head tube or head set of the bicycle. IR sensor 506 can be pointed upwards or rearwards. In some embodiments, IR sensor 506 is actually more than one sensors so it can sense in multiple directions. IR sensor 506 can be used to detect distance between the rider's upper body (or a different part of the body) and the handlebars, head tube or head set of the bicycle. In other embodiments, the IR sensors can be mounted at other locations. Although FIG. 5A shows three IR sensors, other embodiments can use more or less than three IR sensors. For example, one embodiment may only use IR sensor 504 and IR sensor 506. Another embodiment may only implement one of the IR sensors 502, 504 or 506. Note that IR sensors 502, 504 and 506 are in communication with receiver circuit 204 One example of a suitable IR sensor is the model GP2Y0A51SK0F from Sharp, which outputs an analog signal based on measured distance (2-15 cm). Note, however, that other IR sensors will also work.

In one embodiment, controller 206 will use the relative distance results from the multiple IR sensors to distinguish whether a rider is in the sprint position, sitting position, attack position, or rearward position in step 332 of FIG. 3C. FIG. 5B is a table that provides an example of how to distinguish whether a rider is in the sprint position, sitting position, attack position, or rearward position when the bicycle 10 has IR sensors 504 (saddle post sensor) and 506 (head sensor). That is, FIG. 5B is one example implementation of determining the riding position. In this example, the sensors output three usable data values: short distance, middle distance and long distance. For the head sensor 506, the data corresponds to a short distance to the upper body, middle distance to the upper body and long distance to the upper body. For the saddle post sensor 504, the data corresponds to a short distance to the legs, middle distance to the legs and long distance to the legs. In other embodiments, more or less than three data values can be used. In some implementations, an analog data signal can be used. Controller 206 concludes that the rider is in the sitting position if the head sensor 506 outputs a signal indicating middle distance to the upper body and the saddle post sensor 504 outputs a signal indicating short distance to the legs. Controller 206 concludes that the rider is in the sprint position if the head sensor 506 outputs a signal indicating short distance to the upper body and the saddle post sensor 504 outputs a signal indicating long distance to the legs. Controller 206 concludes that the rider is in the attack position if the head sensor 506 outputs a signal indicating short distance to the upper body and the saddle post sensor 504 outputs a signal indicating short distance to the legs. Controller 206 concludes that the rider is in the rearward position if the head sensor 506 outputs a signal indicating long distance to the upper body and the saddle post sensor 504 outputs a signal indicating middle distance to the legs.

FIG. 5C provides an example of how to distinguish whether a rider is in the sprint position, sitting position, attack position, or rearward position when the bicycle 10 has IR sensors 502 (top of saddle sensor 502), 504 (saddle post sensor) and 506 (head sensor). That is, FIG. 5C is one example implementation of determining the riding position. Controller 206 concludes that the rider is in the sitting position if the head sensor 506 outputs a signal indicating middle distance to the upper body, the saddle post sensor 504 outputs a signal indicating short distance to the legs, and the top of saddle sensor 502 outputs a signal indicating short distance to the buttocks. Controller 206 concludes that the rider is in the sprint position if the head sensor 506 outputs a signal indicating short distance to the upper body, the saddle post sensor 504 outputs a signal indicating long distance to the legs, and the top of saddle sensor 502 outputs a signal indicating long distance to the buttocks. Controller 206 concludes that the rider is in the attack position if the head sensor 506 outputs a signal indicating short distance to the upper body, the saddle post sensor 504 outputs a signal indicating short distance to the legs, and the top of saddle sensor 502 outputs a signal indicating short distance to the buttocks. Controller 206 concludes that the rider is in the rearward position if the head sensor 506 outputs a signal indicating long distance to the upper body, the saddle post sensor 504 outputs a signal indicating middle distance to the legs, and the top of saddle sensor 502 outputs a signal indicating long distance to the buttocks.

Figures 6A, 6B:
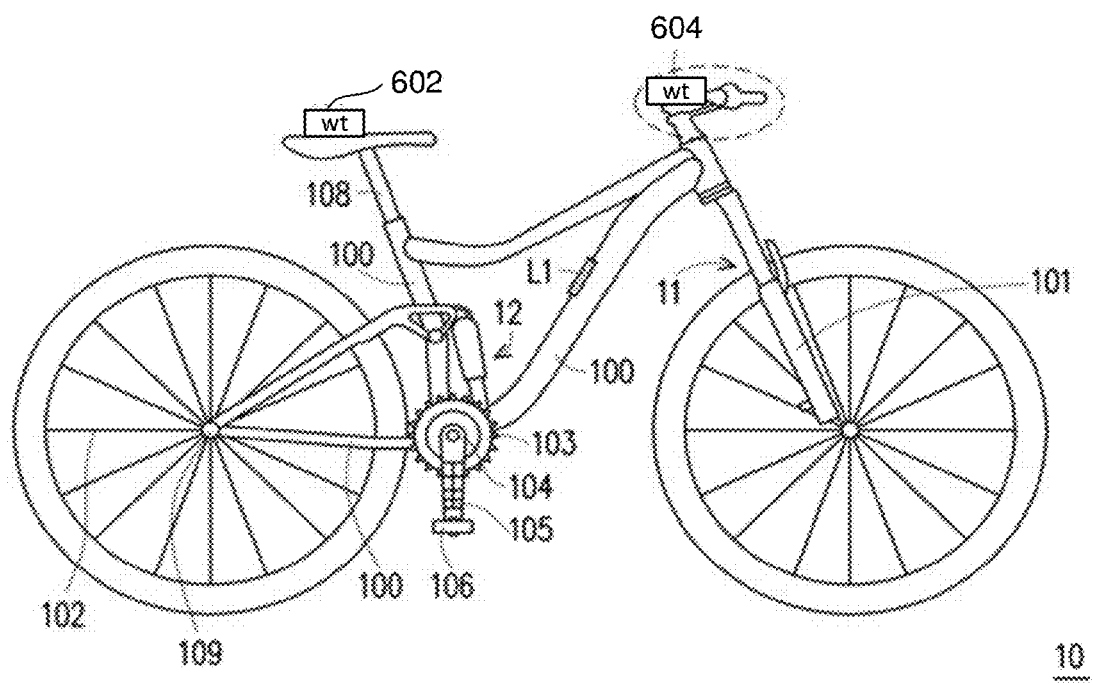
FIG. 6A shows the bicycle of FIG. 1 with multiple weight sensors for detecting position information.
FIG. 6B is a table that correlates rider position with sensor information.

In one embodiment, center of mass sensor system 202 comprises one or more weight sensors. For example, FIG. 6A depicts the bicycle 10 of FIG. 1 equipped with weight (wt) sensors 602 and 604. The weight of the rider will be distributed at the handlebars and saddle. In one embodiment, the weight on the pedal will be ignored because the weight will be influenced by pedaling force. Therefore, in one embodiment, the weight sensors are placed at the handlebar and saddle. Weight sensor 602 is mounted at the saddle. In one embodiment, weight sensor 602 is placed at the top surface of the saddle. Weight sensor 602 measures the force exerted down on the saddle from the rider. Weight sensor 604 is mounted on the top of the handlebars. In one embodiment, weight sensor 604 is actually two sensors, one sensor each at the top of the left handlebar and the top of the right handlebar so that the rider's hands rest on the sensors when riding bicycle 10. In another embodiment weight sensor 604 only sense weight force for one of the left or the right hands. Weight sensor 604 measure the force exerted down on the handlebars by the rider. If the rider leans forward, the force exerted on weights sensor 604 increases. Weight sensors 602 and 604 are in communication (wired or wireless) with receiver circuit 204. Note that some embodiments can implement more than two weight sensors, while other embodiments may only use on weight sensor. Additionally, other embodiments will place the weight sensors in other locations. One example of a suitable weight sensor is the model FSR 402 from Interlink Electronics, which exhibits a decrease in resistance with increase in force applied to the surface of the sensor. Note, however, that other sensors can also be used.

Figures 7A, 7B:
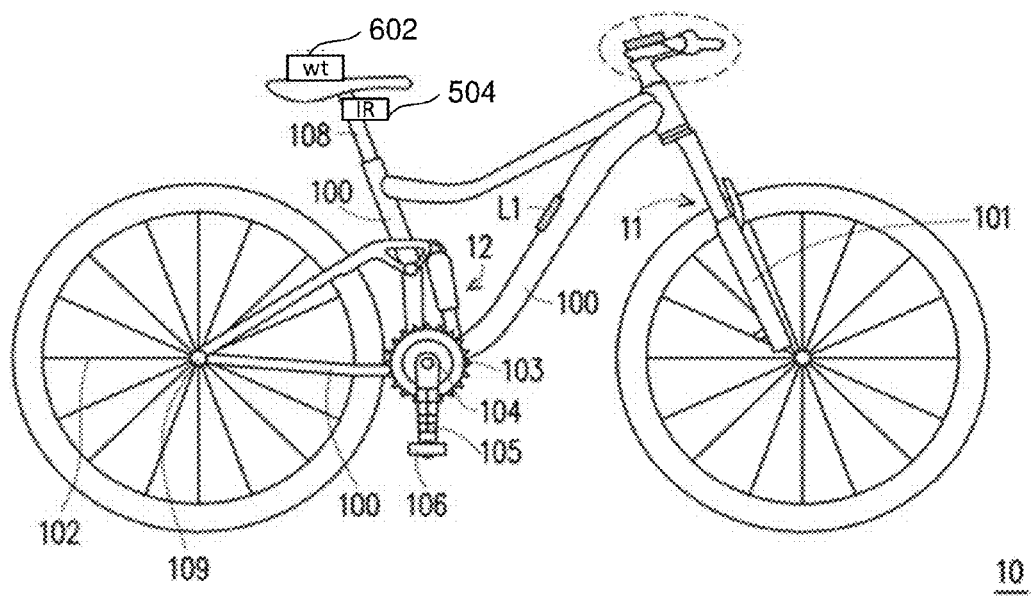
FIG. 7A shows the bicycle of FIG. 1 with infrared sensors and weight sensors for detecting position information.
FIG. 7B is a table that correlates rider position with sensor information.

FIG. 6B provides an example of how to distinguish whether a rider is in the sprint position, sitting position, attack position, or rearward position when the bicycle 10 has weight sensor 602 (saddle weight sensor) and weight sensor 604 (handle bar weight sensor). That is, FIG. 7B is one example implementation of determining the riding position. In this example, the sensors output four usable data values: none (no weight detected), low weight detected, middle weight detected and high weight detected. In other embodiments, more or less than four data values can be used. In some implementations, an analog data signal can be output from the sensor and used by the controller to determine the riding position.

Controller 206 concludes that the rider is in the sitting position if weight sensor 602 (saddle weight sensor) outputs a signal indicating high weight and weight sensor 604 (handle bar weight sensor) outputs a signal indicating low weight. Controller 206 concludes that the rider is in the sprint position if weight sensor 602 (saddle weight sensor) outputs a signal indicating none (no weight detected) and weight sensor 604 (handle bar weight sensor) outputs a signal indicating high weight. Controller 206 concludes that the rider is in the attack position if weight sensor 602 (saddle weight sensor) outputs a signal indicating none (no weight detected) and weight sensor 604 (handle bar weight sensor) outputs a signal indicating middle weight. Controller 206 concludes that the rider is in the rearward position if weight sensor 602 (saddle weight sensor) outputs a signal indicating none (no weight detected) and weight sensor 604 (handle bar weight sensor) outputs a signal indicating low weight.

In one embodiment, center of mass sensor system 202 comprises one or more weight sensors and one or more IR sensors, at the same time. For example, FIG. 7A depicts the bicycle 10 of FIG. 1 equipped with weight (wt) sensor 602 on top of the saddle and IR sensor 504 on the seat post. In some embodiments, additional weight sensors and/or additional IR sensors can be used. FIG. 7B provides an example of how to distinguish whether a rider is in the sprint position, sitting position, attack position, or rearward position when the bicycle 10 has weight sensor 602 (saddle weight sensor) and IR sensor 504 (saddle post IR sensor). That is, FIG. 7B is one example implementation of determining the riding position. Controller 206 concludes that the rider is in the sitting position if weight sensor 602 (saddle weight sensor) outputs a signal indicating high weight and IR sensor 504 (saddle post IR sensor) outputs a signal indicating a short distance. Controller 206 concludes that the rider is in the sprint position if weight sensor 602 (saddle weight sensor) outputs a signal indicating none (no weight detected) and IR sensor 504 (saddle post IR sensor) outputs a signal indicating a long distance. Controller 206 concludes that the rider is in the attack position if weight sensor 602 (saddle weight sensor) outputs a signal indicating none (no weight detected) and IR sensor 504 (saddle post IR sensor) outputs a signal indicating a short distance. Controller 206 concludes that the rider is in the rearward position if weight sensor 602 (saddle weight sensor) outputs a signal indicating none (no weight detected) and IR sensor 504 (saddle post IR sensor) outputs a signal indicating a middle distance.

Figures 8A, 8B:
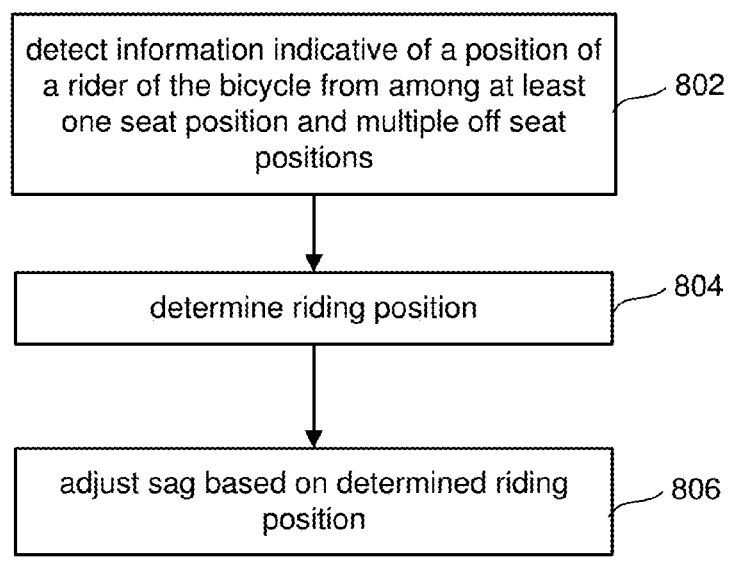
FIG. 8A is a flow chart describing one embodiment of a process for automatically controlling sag for a shock absorber system of a bicycle.
FIG. 8B is a table that correlates rider position with sag adjustments.

FIG. 8A is a flow chart of a process representing an example implementation of the process of FIG. 3C, when the adjustment to the shock absorbing system includes setting the sag of the shock absorber system. In step 802, center of mass sensor system 202 detects information indicative of a position of a rider of the bicycle from among at least one seat position and multiple off seat positions. In step 804, controller 206 determines the riding position of the rider of the bicycle. In step 806, controller 206 adjusts the sag of the shock absorber based on the determined riding position from step 804. In another embodiment, the adjustment of the sag can be based on the detected information indicative of the position of the rider without actually reporting or identifying the actual riding position.

FIG. 8B is a table of one example set of adjustments to sag of the shock absorber system (step 806). In this example, controller 206 would only determine if the rider is in the sitting position, sprint position or attack position. If controller 206 determines that the rider is in the sitting position, then the sag for the rear shock is set at 12.6 mm and the sag for the front shock (fork sag) is set at 12.4 mm. If controller 206 determines that the rider is in the sprint position, then the sag for the rear shock is set at 7.5 mm and the sag for the front shock (fork sag) is set at 15 mm. If controller 206 determines that the rider is in the attack position, then the sag for the rear shock is set at 12.2 mm and the sag for the front shock (fork sag) is set at 21 mm. Note that these are only example values, and other sag values can also be used based on the shock, frame geometry and other design values. Note that in other embodiments, other riding positions can also be considered. Additionally, some embodiments may only adjust sag for the rear shock absorber while other embodiments may only adjust sag for the front shock absorber.

Figure 9:
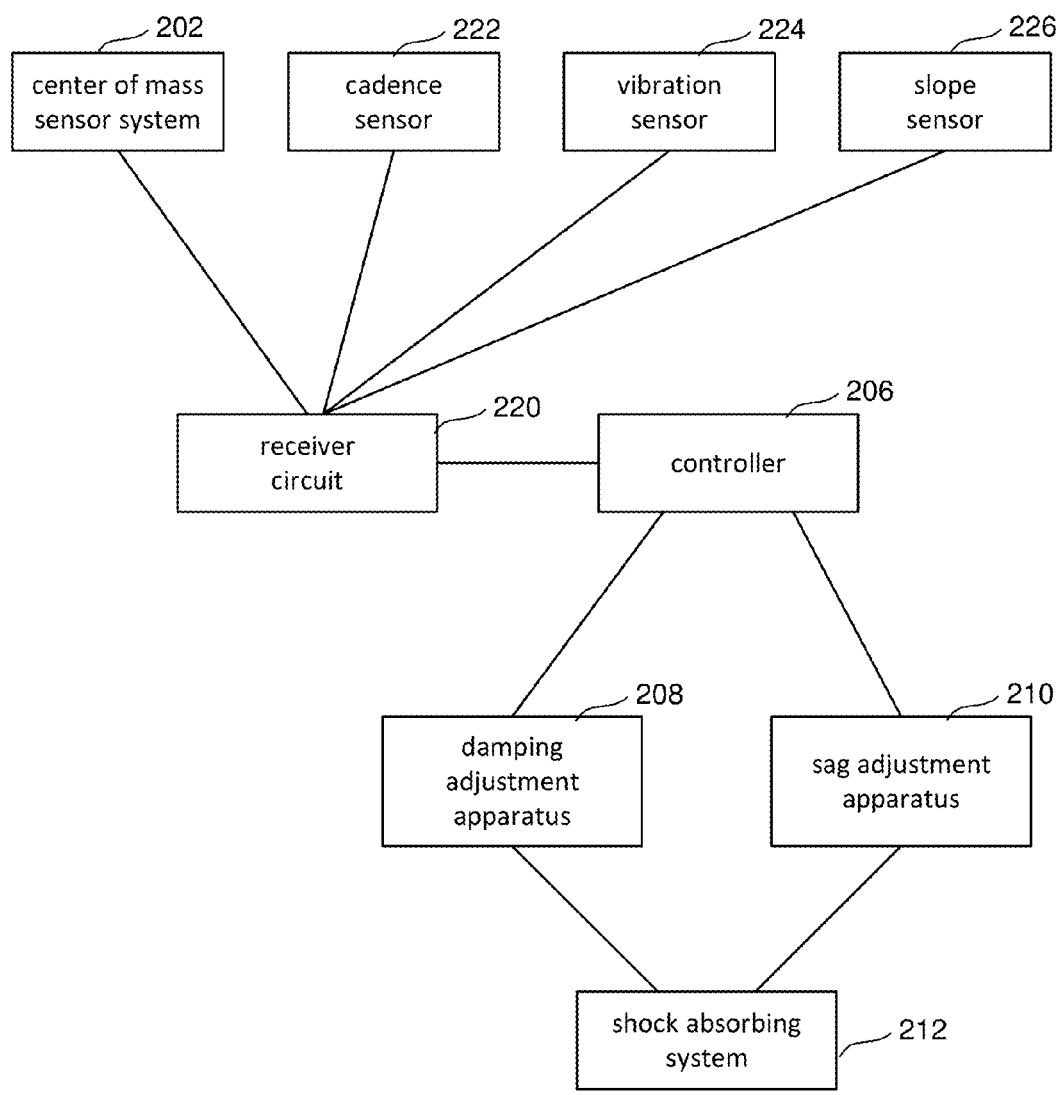
FIG. 9 is a block diagram of a system for automatically controlling a shock absorber system for a bicycle.

FIG. 9 is a block diagram of another embodiment of a system for automatically controlling a shock absorber system for a bicycle. In comparison to the system of FIG. 2, the system of FIG. 9 adds a cadence sensor 222, vibration sensor 224 and slope sensor 226. FIG. 9 shows center of mass sensor system 202 (described above), cadence sensor 222, vibration sensor 224 and slope sensor 226 all connected (wired or wireless) to receiver circuit 220, which is connected (wired or wireless) to controller 206. As described above, controller 206 is connected to damping adjustment apparatus 208 and sag adjustment apparatus 210 for adjusting shock absorbing system 212. In the embodiment of FIG. 9, shock absorbing system 212 can be adjusted based on the output of center of mass sensor system 202 in conjunction with the output of cadence sensor 222, the output of vibration sensor 224 and the output of slope sensor 226, or any subset thereof. For example, shock absorbing system 212 can be adjusted based on the output of center of mass sensor system 202 and the output of cadence sensor 222, based on the output of center of mass sensor system 202 and the output of vibration sensor 224, or based on the output of center of mass sensor system 202 and the output of slope sensor 226.

Cadence sensor 222 is configured to detect a pedaling cadence of the bicycle 10 and output a pedaling signal. The pedaling cadence sensor 222 may be disposed at one of the chain ring 103, the crank spindle 104, the crank arm 105, the pedal 106, and/or the frame 100, etc., of the bicycle 10. In addition, the pedaling cadence sensor 210 may also be disposed at a leg, such as both legs (e.g. inner sides of thighs) of the rider, or on a shoe of the rider. In one embodiment, the controller uses a table or set of curves to adjust the damping or sag based on cadence.

Slope sensor 226 is configured to detect a slope of a location of the bicycle 10 and output a slope signal, such that the slope signal is transmitted to the controller 206 through the receiver circuit 220. In one embodiment, the controller 206 chooses a relational curve of damping according to the slope signal, and outputs a control signal according to the pedaling signal based on the chosen relational curve of damping.

Vibration sensor 224 may be disposed at a position such as the saddle 107, the saddle post 108, the bicycle handle 112, the handle stem 111, the frame 100, the front fork 101, the rear fork 114, or the rear shock absorber 12, etc., of the bicycle 10. The vibration sensor 224 detects vibration generated by a body of the bicycle 10, so as to output a corresponding vibration signal. The vibration sensor 224 is a g-sensor, for example. In one embodiment, the controller uses a table or set of curves to adjust the damping or sag based on vibration.

FIG. 10A is a flow chart describing one embodiment of a process for automatically controlling a shock absorber system for a bicycle using the system of FIG. 9. In step 902, center of mass sensor system 202 detects information indicative of a position of a center of mass of a rider of the bicycle (this can include riding position). The detected information can be in various forms, as described above, as no one particular form is required. In step 904, cadence sensor 222 detects pedaling cadence. In step 906, vibration sensor 224 detects vibration information. In step 908, slope sensor 226 detects slope of the ground under the bicycle. In step 910, controller 206 adjust shock absorber system 212 based on the detected information indicative of a position of a center of mass of a rider, cadence, vibration information and/or slope (or any subset thereof). In one embodiment, a table or set of tables are used to correlate the sensor data with adjustments to damper or sag. In another embodiment, a set of mathematical functions are used to correlate the sensor data with adjustments to damper or sag.

FIGS. 10B1 and 10B2 are graphs that depicts damper curves. FIG. 10B1 depicts two damper curves implemented as step functions: one damper curve for "Forward" position types (see FIG. 3E) and one curve for "Backward" position types. The X axis is for pedaling cadence in RPM. The y axis is the damper force applied to the shock absorbing system. At 0 rpm, if the rider is in a forward position then the damper is set at 2 and if the rider is in a backward position then the damper is set at 0. At 40 rpm, if the rider is in a forward position then the damper is set at 3 and if the rider is in a backward position then the damper is set at 2. At 60 rpm, if the rider is in a forward position then the damper is set at 3 and if the rider is in a backward position then the damper is set at 4. At 90 rpm, if the rider is in a forward position then the damper is set at 4 and if the rider is in a backward position then the damper is set at 3. At 135 rpm, if the rider is in a forward position then the damper is set at 4 and if the rider is in a backward position then the damper is set at 3.

FIG. 10B2 depicts two damper curves implemented as continues curves: one damper curve for "Forward" position types and one curve for "Backward" position types. The X axis is for pedaling cadence in RPM. The y axis is the damper force applied to the shock absorbing system. For example, at 60 rpm, if the rider is in a forward position then the damper is set at 3.40 and if the rider is in a backward position then the damper is set at 2.33.

In one embodiment, the tables of FIG. 10B1 or 10B2 can used with a system that has center of mass sensors (e.g., IR or weight sensors) and pedaling cadence sensors. The process of FIG. 10A can be performed, with steps 906 and 908 not implemented and step 910 adjusts the shock absorber based on center of mass data and cadence data. In this embodiment, the center of mass data is used to select one of the two curves of FIG. 10B1 (or FIG. 10B2) and the cadence data is used to choose a damper setting. For example, the weight or IR sensors can be used to determine that the rider is in a sitting position, sprint position, attack position or rearward position (as discussed above). FIG. 3E correlates these positions to "forward" or "backward" so that the appropriate curve is selected from FIG. 10B1 (or FIG. 10B2). Then the cadence data is used to select a point on the selected curve and the damper force is determined.

In one embodiment that uses a cadence sensor, vibration sensor and slope sensors, there can be a first set of "backward" and "forward" curves of cadence versus damping for a first combination of slope and vibration, a second set of "backward" and "forward" curves of cadence versus damping for a second combination of slope and vibration, a third set of "backward" and "forward" curves of cadence versus damping for a third combination of slope and vibration, etc.

FIG. 10C is a flow chart describing another embodiment of a process for automatically controlling a shock absorber system for a bicycle using the system of FIG. 9. In step 930, center of mass sensor system 202 detects information indicative of a position of a center of mass of a rider of the bicycle. The detected information can be in various forms, as no one particular format is required. In step 932, cadence sensor 222 detects pedaling cadence. In step 934, vibration sensor 224 detects vibration information. In step 936, slope sensor 226 detects slope of the ground under the bicycle. In step 938, the controller 206 starts with a default damper setting, or the damper setting currently being used. In step 940, the damper setting from step 938 is adjusted based on the information detected by the center of mass sensor system 202 in step 930, in accordance with the teachings above. In step 942, the damper setting is then adjusted based on the information from the cadence sensor detected in step 932. In one embodiment, a faster cadence will result in a stiffer damper. In step 944, the damper setting is then adjusted based on the information from the vibration sensor detected in step 934. In one embodiment, less vibration or faster vibration will result in a stiffer damper. In step 946, the damper setting is then adjusted based on the information from the slope sensor detected in step 936. In one embodiment, a steeper incline will result in a stiffer damper.

Figure 10D:
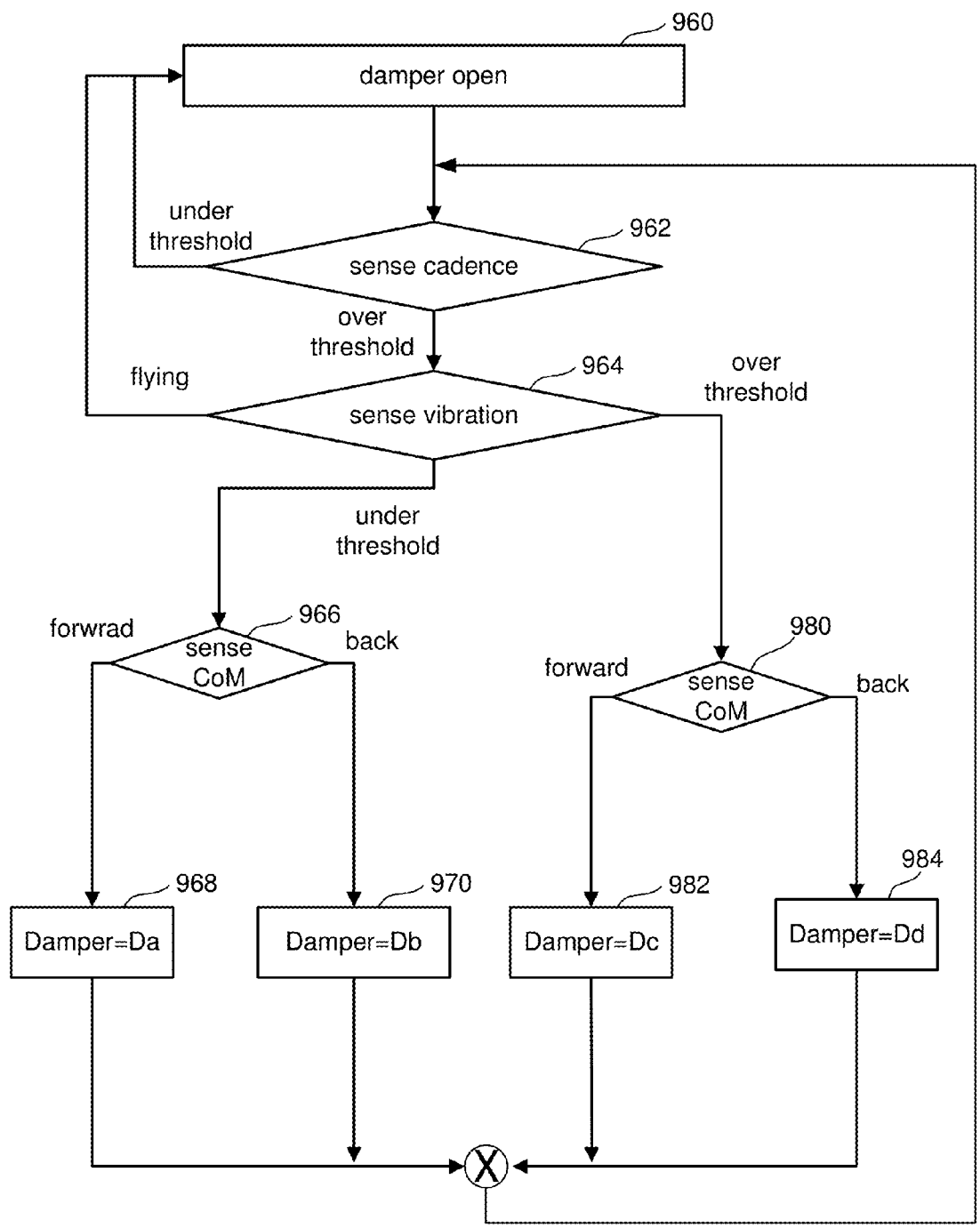
FIG. 10D is a flow chart describing one embodiment of a process for automatically controlling a shock absorber system for a bicycle.

FIG. 10D is a flow chart describing one embodiment of a process for automatically adjusting the damper of a shock system based on cadence, vibration and center of mass (CoM). The flow chart of FIG. 10C applies to the embodiment of FIG. 9 (without slope sensor 226); however, the flow chart of FIG. 10C can apply to other embodiments of structure. In step 960, the damper for the shock absorber is open. In one example, the damper is completely open. In another example, the damper is open to the softest setting. In step 962, the data from the cadence sensor 222 is received and analyzed. If the signal from the cadence sensor 222 is below (or equal to) a threshold, then the process is complete, the damper stays open and the method loops back to step 960. If the signal from the cadence sensor 222 is greater the threshold, then the data from vibration sensor 224 is considered in step 964. If vibration sensor 224 indicates that the bicycle is flying (i.e. in a weightless state), then the process is complete, the damper stays open and the method loops back to step 960. If the data from vibration sensor 224 does not indicate that the bicycle is flying and the data from vibration sensor is less than or equal to a threshold, then data from center of mass sensor system 202 is considered in step 966. If the data from vibration sensor 224 does not indicate that the bicycle is flying and the data from vibration sensor is greater than a threshold, then data from center of mass sensor system 202 is considered in step 980.

In step 966, it is determined whether data from center of mass sensor system 202 indicates that the rider is in a forward position or a back position. In one embodiment, the sprint position is treated as a forward position because the rider's center of mass is forward of the bicycle's center of mass. In this condition, the damper is set as firmer. The sitting, attack, and rearward position are treated as back positions because the rider's center of mass is in back of the bicycle's center of mass. In this condition, the damper is set as softer. If the rider is in a forward position (controller determines the riding position to be the sprint position), then the damper is set to a value of Da in step 968. If the rider is in a back position (controller determines the riding position to be the sitting, attack, or rearward positions), then the damper is set to a value of Db in step 970.

In step 980, it is determined whether data from center of mass sensor system 202 indicates that the rider is a forward position or a back position. If the rider is in a forward position, then the Damper is set to a value of Dc in step 982. If the rider is in a back position, then the Damper is set to a value of Dd in step 984. Note that (Da≥Db) and (Dc≥Dd) and (Da≥Dc) and (Db≥Dd). After steps 968, 970, 982 or 984, the process loops back to step 962.

One embodiment includes an apparatus for automatically controlling a shock absorber system for a bicycle, comprising: a position sensor system configured to detect information indicative of a position of a rider of the bicycle from among at least one forward type of position and multiple backward type of positions; and a controller in communication with the position sensor system, the controller adjusts the shock absorber system based on the detected information.

One embodiment includes an apparatus for automatically controlling a shock absorber system for a bicycle, comprising: a sensor system configured to detect information indicative of a position of a rider of the bicycle from among at least one on seat position and multiple off seat positions; and an adjustment circuit in communication with the sensor system to determine a riding position of the rider based on the detected information and adjust a shock absorber system of the bicycle based on the determined riding position.

One embodiment includes a method for automatically controlling a shock absorber system for a bicycle, comprising: detecting information indicative of a position of a rider of the bicycle from among at least one on seat position and multiple off seat positions; and automatically adjusting the shock absorber system based on the detected information.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles and practical application of certain embodiments, to thereby enable others skilled in the art to best utilize the invention in various embodiments and with various modifications as are suited to the particular use contemplated. It is intended that the scope be defined by the claims appended hereto.

We claim:

1. An apparatus for automatically controlling a shock absorber system for a bicycle, comprising:
 a position sensor system that includes at least two distance sensors for detecting information about distances between the rider and the two sensors, the position sensor system is configured to detect information indicative of a position of a rider of the bicycle from among a set of positions that includes at least one forward type of position and multiple backward type of positions; and
 a controller in communication with the position sensor system, the controller is configured to classify the rider into one position of the set of positions based on the detected distances between the rider and the two sensors,
 the controller adjusts the shock absorber system based on the classified one position.

2. The apparatus of claim 1, wherein:
 the controller adjusts a damping force of the shock absorber system based on the classified one position.

3. The apparatus of claim 1, wherein:
the controller classifies the rider by determining whether the rider is in a sitting position, sprinting position, attacking position or rearward position.

4. The apparatus of claim 1, wherein:
the two distance sensors include at least one infrared sensor mounted in proximity to a saddle of the bicycle and one infrared sensor mounted in proximity to handlebars for the bicycle, the infrared sensors measure distance.

5. The apparatus of claim 1, wherein:
the position sensor system further includes at least two weight sensors mounted at different locations on the bicycle; and
the controller adjusts the shock absorber system based one currently measured weights at the two weight sensors.

6. The apparatus of claim 1, wherein:
the position sensor system includes at least one weight sensor and one infrared sensor, the infrared sensor measures distance, the controller adjusts the shock absorber system based on the weight data from the weight sensor and distance data from the infrared sensor.

7. The apparatus of claim 1, further comprising:
a pedaling cadence sensor, the pedaling cadence sensor is configured to detect pedaling cadence for the bicycle and output a pedaling signal based on the detected pedaling cadence, the controller is in communication with the pedaling cadence sensor, the controller adjusts the shock absorber system by choosing a damping force for the shock absorber system, the controller chooses a damping force by selecting one or multiple curves based on the detected information and selecting a point on the chosen curve corresponding to the pedaling signal, the chosen point corresponds to the damping force.

8. The apparatus of claim 1, further comprising:
a pedaling cadence sensor, the pedaling cadence sensor is configured to detect pedaling cadence for the bicycle and output a pedaling signal based on the detected pedaling cadence, the controller is in communication with the pedaling cadence sensor, the controller adjusts a damping force of the shock absorber system based on at least the pedaling signal and the detected information.

9. The apparatus of claim 1, further comprising:
a slope sensor in communication with the controller, the slope sensor is configured to detect a slope of a location of the bicycle and output a slope signal, the controller adjusts the damping force of the shock absorber system based on the detected information and the slope signal.

10. The apparatus of claim 1, further comprising:
a vibration sensor in communication with the controller, the vibration sensor is configured to detect vibration of the bicycle and outputting a vibration signal, the controller adjusts the damping force of the shock absorber system based on the detected information and the vibration signal.

11. An apparatus for automatically controlling a shock absorber system for a bicycle, comprising:
a sensor system configured to detect information indicative of a position of a rider of the bicycle from among at least one on seat position and multiple off seat positions, the sensor system includes at least two weight sensors mounted at different locations on the bicycle; and
an adjustment circuit in communication with the sensor system, the adjustment circuit is configured to adjust a shock absorber system of the bicycle based on current weight data sensed from the two weight sensors during operation of the bicycle.

12. The apparatus of claim 11, wherein:
the sensor system includes at least one infrared sensor mounted in proximity to a saddle of the bicycle and one infrared sensor mounted in proximity to handlebars for the bicycle, the infrared sensors measures distance.

13. A method for automatically controlling a shock absorber system for a bicycle, comprising:
detecting information indicative of a position of a rider of the bicycle including distances between the rider and the two sensors; and
automatically adjusting the shock absorber system based on the detected information including the distances between the rider and the two sensors.

14. The method of claim 13, wherein:
the detecting information indicative of the position includes sensing weight forces of the rider at two different locations on the bicycle; and
the adjusting the shock absorber system is additionally based on the sense weight forces.

15. An apparatus for automatically controlling a shock absorber system for a bicycle, comprising:
a sensor system configured to detect information indicative of a position of a rider of the bicycle, the sensor system includes at least two sensors mounted at different locations on the bicycle; and
an adjustment circuit in communication with the sensor system and configured to adjust a shock absorber system of the bicycle based on sensed relative distances between the rider and the two sensors.

* * * * *